(12) United States Patent
Luo

(10) Patent No.: US 7,973,187 B2
(45) Date of Patent: Jul. 5, 2011

(54) NATURAL OIL BASED HALOGENATED COMPOUNDS

(75) Inventor: Ning Luo, Fayetteville, AR (US)

(73) Assignee: BioBased Technologies, LLC, Springdale, AR (US)

( * ) Notice: Subject to any disclaimer, the term of this patent is extended or adjusted under 35 U.S.C. 154(b) by 0 days.

(21) Appl. No.: 12/381,241

(22) Filed: Mar. 10, 2009

(65) Prior Publication Data

US 2009/0234037 A1 Sep. 17, 2009

Related U.S. Application Data

(60) Provisional application No. 61/069,464, filed on Mar. 14, 2008.

(51) Int. Cl.
*C07C 59/00* (2006.01)

(52) U.S. Cl. ....................................................... 554/219

(58) Field of Classification Search .................... 554/219
See application file for complete search history.

(56) References Cited

U.S. PATENT DOCUMENTS

| | | | |
|---|---|---|---|
| 3,732,265 A | 5/1973 | Roth | |
| 4,147,678 A | 4/1979 | Mao et al. | |
| 4,826,944 A | 5/1989 | Hoefer | |
| 5,391,583 A | 2/1995 | Blount | |
| 5,824,712 A * | 10/1998 | Willkomm et al. | ........... 521/135 |

OTHER PUBLICATIONS

Fire Retardancy of Polymeric Materials, Weil and Levchik, 2000, p. 572.
Polyurethane Networks from Formiated Soy Polyols, Monteavaro, et al, 2000, 77: 467-473.
Journal of Polymer Science: Part A Polymer Chemistry, 2000, 38: 4062-4069.

* cited by examiner

*Primary Examiner* — Deborah D Carr
(74) *Attorney, Agent, or Firm* — Baker IP Law Group; Stan Baker

(57) ABSTRACT

Natural oil based halogenated compounds that are useful as flame retardants for polymeric materials, such as polyurethanes. Novel compositions of matter, novel processes for preparing such compositions of matter, and end use applications of the novel compositions of matter. The process comprises the reaction of natural oil hydroxylates with halogenated reactive materials such as halogenated anhydrides of organic acids or their esters in the presence of a titanium catalyst.

15 Claims, No Drawings

NATURAL OIL BASED HALOGENATED COMPOUNDS

This application claims priority from U.S. Provisional Patent Application No. 61/069,464 filed Mar. 14, 2008.

This invention deals with natural oil based halogenated compounds that are useful as flame retardants for polymeric materials, such as polyurethanes. It deals with novel compositions of matter, novel processes for preparing such compositions of matter, and end use applications of the novel compositions of matter.

BACKGROUND OF THE INVENTION

There are a large number of conventional halogenated products that are available for use in flame retardancy in polymeric systems. These materials are petroleum based. Some such materials have been used in polyurethane foams as disclosed by E. D. Weil and S. V. Levchik, Fire Retardancy of Polymeric Materials, edited by Arthur F. Grand and Charles A. Wilkie, Marcel Dekker, Inc., 2000, page 572.

These include commercially available flame retardants for flexible polyurethane that includes both chlorinated and brominated derivatives that may include reactive hydroxyl, amine and anhydride groups.

Natural oils are the triglycerides of saturated and unsaturated fatty acids from plants and animal fats and microorganisms.

Natural oil hydroxylates included chemically unmodified and modified natural oil molecules that contain hydroxyl groups. Such compounds are either pure fatty acid derivatives or the mixtures of these fatty acid derivatives that contain triglycerides, diglycerides, monoglycerides, and their oligomerized varieties. Examples of natural oil hydroxylates include naturally existing natural oil that contains hydroxy groups such as castor oil; and the products of fatty acids and polyhydric alcohols with the structure of monoglycerides, diglycerides, and triglycerides. Examples of natural oil hydroxylates also include the products that chemical modified with by means of epoxidation, transesterification, alcoholysis, aminolysis, ozonolysis, hydrolysis, alkoxylation, and hydroformation to generate hydroxy groups. Examples of such process have been descrivbed in the prior art such as, for example, U.S. Pat. Nos. 6,686,435, 6,107,433, U.S. 2006/0041156, and WO2006/020965 or as described in the following technical publication: L. L. Monteavaro, E. O. da Silva, A. P. O. Costa, D. Samios, A. E. Gerbase, C. Petzhold, Polyurethane Networks from Formiated Soy Polyols: synthesis and Mechanical Characterization, JAOCS (2005), 82: 365-371; A. Guo, I. Javni, Z. Petrovic, J. Appl. Poly. Sci. (2000), 77: 467-473; A. Zlatanic, C. Lava, W. Zhang, X. S. Petrovic, J. Poly. Sci.: Part B: Polymer Physics (2004), 42: 809-819; A. Guo, I. Vavni, Z. Petrovic, Rigid Polyurethane Foams Based on Soybean Oil, J. Appl. Poly. Sci (2000), 77: 467-473

The halogenated anhydrides or their corresponding alkyl esters that are useful for the present invention are those, for example, halogenated maleic anhydride, halogenated phthalic anhydride, 2,3-dichloromaleic anhydride, 2,3-dibromaleic anhydride, dichlorophthalic anhydride, 4-chloro-1,8-nathalic anhydride, chlorophathalic anhydride, dichlorophathalic anhydride, Examples of brominated products include tetrabromophthalic anhydride, tetra bromophthalate diol, tetrabromobenzoate esters and dibromoneopentyl glycol, pentabromodiphenyl oxide, tribromonepentyl alcohol, decabromodiphenyl oxide, bis(tribromophenoxyl)ethane, hexabromocyclododecane, and chlorinated paraffins, and the like.

Most of these materials are of relatively low molecular weight with limited compatibility with polymer matrices and are made with the use of petroleum based raw materials.

Attempts were made in the past to produce halogenated compounds based on castor oil and/or ricinoleic esters as disclosed in U.S. Pat. No. 3,732,265 that issued in 1973 to Roth and Hills. The compounds were synthesized by reacting castor oil and/or ricinoleic ester and aliphatic haloepoxide for non-rigid polyurethane foams. This is a different approach from the present invention and the application of this compound is only for non-rigid foams.

Attempts were made in the past to synthesize halogenated compounds based on soybean oil as disclosed in Andrew Guo, Youngjin Cho, Zoran S. Petrovic, Structure and Properties of Halogenated and Non-halogenated Soy Based Polyols, Journal of Polymer Science: Part A Polymer Chemistry, 38, 3900 to 3910 (2000) and Zoran S. Petrovic, Andrew Guo, Wei Zhang, Structure and Properties of Polyurethanes Based on Halogenated and Non-halogenated Soy-based Polyols. Journal of Polymer Science: Part A Polymer Chemistry, 38, 4062-4069 (2000).

The compounds were synthesized by reacting epoxidized soybean oil with hydrochloric or hydrobromic acid in a solvent. The resulting chlorinated and brominated derivatives were characterized as having equivalent weights of 285 and 308, hydroxyl numbers of 197 and 182, a functionality of 3.8 and 4.1, and a halogen content of 12.43 and 25.33, respectively. The brominated compound was thermally unstable.

Using a natural oil based matrix of higher molecular weight results in reduced migration of the flame retardant, and allows for increased compatibility of the flame retardant with a polymer without detrimentally affecting the mechanical properties of the polymer.

THE INVENTION

Thus, there is provided a process for preparing halogenated natural oils, wherein the process comprises providing a hydroxylated natural oil and under negative pressure, contacting the hydroxylated natural oil with a halogenated reactive material in the molar ratio of hydroxylated natural oil to halogenated reactive material ranging from 0.5 to 2.5:1 at a temperature in the range of from 130° C. to 200° C. for a period of time of from 3 hours to 25 hours, in the presence of a catalyst.

What is meant by "negative pressure" herein is that the process is subjected to a vacuum of from 10 to about 400 mm Hg with the most preferred range being from 150 to 300 mm Hg. The vacuum is applied when the temperature of the first reaction step reaches an elevated temperature of, for example, at least 100° C. and the vacuum is held until the after the final step of the process.

In a second embodiment, there is a halogenated natural oil when prepared by the process set forth just Supra.

In still another embodiment, there is a combination of a halogenated natural oil described just Supra and a processable polymeric material.

A further embodiment is a process of combining at least one halogenated natural oil as described just Supra, at least one natural oil polyol and at least one conventional, petroleum based flame retardant.

Still one other embodiment of this invention is the use of a halogenated natural oil polyol as described herein in the preparation of polymeric materials.

One final embodiment of this invention is a process for the preparation of halogenated natural oils directly from raw natural oils wherein the process comprises providing a raw natural oil and contacting the raw natural oil with a hydroxylated amine in the presence of a titanium catalyst for a period of time of from 2 to 6 hours.

Thereafter the reaction product is contacted with a halogenated reactive materials in the molar ratio of hydroxylated natural oil to halogenated reactive material ranging from 0.5 to 2.5:1.

Thereafter, contacting the reaction product just Supra with a material selected from the group consisting of a cycloalkyl carbonate, an alkylene oxide, and an alkyl glycidyl ether along with a tertiary amine catalyst and heating at a temperature of from 130 to 200° C. for a period of time of from 1.0 hours to about 5 hours and then thereafter, reducing the temperature to a range of from 120 to 170° C. for an additional period of time ranging from 1 hour to 5 hours.

DETAILED DESCRIPTION OF THE INVENTION

This invention deals with novel natural oil based halogenated compounds that are useful as flame retardants for polymeric materials, such as polyurethanes. It deals with novel compositions of matter, novel processes for preparing such compositions, and end use applications of the novel compositions of matter.

Natural oils that are useful for the invention include but are not limited to soybean oil, castor oil, palm oil, rapeseed oil, cotton oil, corn oil, sunflower oil, olive oil, canola oil, peanut oil, coconut oil, algae oil, jatropha oil, as well as animal fats. Preferred vegetable oils are soybean oil, castor oil, canola oil, jatropha oil, algae oil, palm oil and their blends.

The natural oil hydroxylates that are useful in this invention are, for example, castor oil, soybean oil hydroxylate, canola oil hydroxylates, palm oil hydroxylates, jatropha oil hydroxylates, and algae oil hydroxylates.

The hydroxylated natural oil is contacted in a reaction vessel with a halogenated reactive material such as, for example, a halogenated anhydride an organic acid or their esters, such as, for example, halogenated maleic anhydride and halogenated phthalic anhydride. Preferred halogens are chlorine and bromine.

The molar ratio of the hydroxylated natural oil to halogenated reactive material ranges from 0.5 to 2.5 to 1 and a preferred range for this ratio is 0.75 to 2.0:1 and a more preferred range is 1.0 to 1.5 to 1.

Temperature range for the reaction is from 130° C. to 200° C., a preferred range being 140° C. to 180° C. and a most preferred range being from 150° C. to 170° C.

The time for the reaction is not overly critical and the range in from 3 hours to 25 hours, with 5 hour to 20 hours being preferred and the most preferred is from 3 hours to 15 hours.

The reaction can be carried out with or without a solvent. A preferred solvent is tris(chloroisopropyl) phosphate.

The halogenated anhydrides or their corresponding alkyl esters that are useful for the present invention are those, for example, halogenated maleic anhydride, halogenated phthalic anhydride, 2,3-dichloromaleic anhydride, 2,3-dibromomaleic anhydride, dichlorophthalic anhydride, 4-chloro-1,8-nathalic anhydride, chlorophthalic anhydride, dichlorophthalic anhydride, tetrabromophthalic anhydride and their corresponding alkyl esters, such as methyl or ethyl esters.

Catalysts that are useful in this invention are organometallic catalysts, that include but are not limited to titanates that include but are not limited to titanium alkoxide catalysts, such as, for example, titanium ethoxide, titanium (IV)2-ethylhexoxide, titanium (IV) n-butoxide, and titanium (IV)isopropoxide, titanium n-propoxide, titanium isobutoxide, and titanium butoxy isopropoxy, or other titanates.

Such titanates are commercially available under the trade names of, for example, Tyzor® (DuPont), Vertec®, (Johnson Matthey Catalysts), New West Rd., Pasadena, Tex. 77507-1882.

The amount of the catalyst is in the range of 0.05% to 2.0 weight % based on the weight of starting hydroxylated vegetable oil. The preferred range is 0.05% to 1.0%, and the most preferred range is 0.08 to 0.50% by weight.

Carbonates that are useful for the invention include but are not limited to ethylene carbonate, propylene carbonate and glycerol carbonate.

In another embodiment of this invention, there is provided halogenated natural oil when prepared by the process described just Supra.

The halogenated natural oils of this invention have a use as flame retardants in various polymeric materials, especially in polyurethane foam products and thus, contemplated within the scope of this invention are combinations of polymeric materials with such flame retardants.

Further, the materials of this invention can be used in combinations with natural oil polyols and conventional, petroleum based flame retardants, even when those materials are mixed together.

In another embodiment of this invention, halogenated natural oils can be prepared directly from raw natural oils such as raw soybean oil.

This process comprises providing raw natural oil and contacting the raw natural oil with an with a material selected from the group consisting essentially of a polyhydric alcohol and an alkyl alkanolamine, in the presence of a catalyst for a period of time of from 2 to 6 hours to form a natural oil hydroxylate and then contacting the reaction product with a halogenated reactive material in the molar ratio of raw natural oil to halogenated reactive material ranging from 0.5 to 2.5:1 for a period of time of 1 hour or less to form an acidic intermediate.

Thereafter, contacting the reaction product with a material selected from the group consisting of a cycloalkyl carbonate, an alkylene oxide, and an alkyl glycidyl ether and a tertiary amine catalyst and heating the reaction mass at a temperature of from 130 to 200° C. for a period of time of from 1.0 hours to about 5 hours and then thereafter, reducing the temperature to a range of from 120 to 170° C. for an additional period of time ranging from 1 hour to 5 hours.

The alkylene oxides that are useful for the invention include, but are not limited to, for example, propylene oxide, ethylene oxide, butane oxide and epichlorohydrin.

Glycidyl ethers that are useful for this invention include but are not limited to, 1,6-hexanediol diglycidyl ether, 2-ethylhexyl glycidyl ether, allyl glycidyl ether, n-butylglycidyl ether, poly)propylene glycol)diglycidyl ether, phenyl glycidyl ether, chlorophenyl glycidyl ether, and tridecylglycidyl ether.

Alkanolamines that are useful for this invention include, but are not limited to, those of the secondary amines combined with at least one hydroxyl group in their molecular structures and having molecular weights less than 200 Daltons. Examples for the purpose of this invention include methylaminoethanol, diethanolamine, 2-(ethylamino)ethanol, N-benzylethanolamine, 2-anilinoethanol, 3-pyrrolidinol, prolinol, 3-piperidinol, 2-(isopropylamino)ethanol, 1-(2-hydroxyethylamino)propanol, 3-methylamino-1,2-propanediol, 2-piperidinemethanol, 2-(tert-butylamino)ethanol, 2-(butylamino)ethanol, 1-(2-amino-ethylamino)-2-propanol, 2-(3-aminopropylamino)ethanol, 3-(2-hydroxyethylamino)-1-propanol, and 2-(2-ethylanilino)ethanol, diisopropanolamine, triisopropanolamine, pyrrolidinol, prolinol, piperidinol, piperidinemethanol, and any combinations of these amines.

EXAMPLES

The novel polyols were analyzed using the following: AOCS Official Process DC-3d-63 for the acid numbers; AOCS Official Process Cd 1-25 for the determination of the Iodine number; AOCS Official Process c 13-60 for hydroxyl number; AOCS Official method Tb 2-64 for water content; and AOCS Official Process Td 1a-64 for color Gardner 1963 (Glass Standard). Bromine content was calculated based on the bromine concentration in the bromine-containing raw material and the total weight of the reactants. Bio-content was calculated as weight percent of soybean oil derivatives and the total weight of the reactants.

Example 1

Brominated Polyol using Soybean Hydroxylate

Seven hundred and eight grams of soybean oil hydroxylate (hydroxyl number 114 mg/KOH/g, sold by BioBased Technologies, LLC as Agrol® 3.6), one hundred eighty-five and one-half g of tetrabromophthalic anhydride (TBPA, Albemarle Corporation, 451 Florida Street, Baton Rouge, La. 70801), and 1.0 g of titanium (IV) n-butoxide were mixed in a 3000 ml, three-necked glass flask. The reaction was carried out at 135° C. for 4 hours. Then the reactor was cooled down to 60° C., and the product was removed from the reactor. The resultant brominated polyol had a hydroxyl number of 43 mg KOH/g, an acid number of 0.8 mg KOH/g, a viscosity of 4,120 cP at 25° C., a water content of 0.05%, a bromine content of 13%, and a bio-content of 81%.

Example 2

Brominated Polyol using Soybean Oil Hydroxylate and Glycerol

Two hundred grams of soybean oil hydroxylate (hydroxyl number 129 mg KOH/g, sold by BioBased Technologies, LLC as Agrol® 4.3), 33.5 g of glycerol, 168.6 g of TBPA, and 0.19 g of titanium (IV) isopropoxide were mixed in a 500 ml three-necked glass flask. The reaction was carried out at 180° C. for 19 hours. Then the reactor was cooled down to 60° C. and the product was removed from the reactor. The resultant polyol had a hydroxyl number of 77 mg KOH/g, an acid number of 13 mg KOH/g, a viscosity of 15,000 cP at 25° C., a bromine content of 29% and a bio-content of 56%.

Example 3

Brominated Polyol using Soybean Oil as a Raw Material

One hundred Grams of soybean oil, 23.1 grams of diethanolamine, and 0.05 g of titanium (IV) 2-ethylhexoxide were mixed in a 500 ml three-necked glass flame. The reaction was carried out at 150° C. for 4 hours. Then, 156 g of TBPA was then charged into the reactor in three portions until the reaction mixture became a clear solution, which took about 20 minutes. Then, 39 g of ethylene carbonate and 0.8 g of triethylenediamine was added into the reactor. The reaction was carried out at 180° C. for 2.5 hours, and then at 150° C. for 3 hours. The resultant polyol showed good phase stability and it had an acid number of 8.7 mg KOH/g, a bromine content of 34%, and a bio-content of 31%.

Example 4

Burning Test

A burning test was conducted using cuboid foam specimen with dimensions of 1.5×3×0.4 inches with a TS3000KC-Quickfire® self-igniting torch kit (Bernz-O-Matic, One Bernz-O-Matic Drive, Madia, N.Y. 14103). The flame nozzle has a 45° angle with the body of the 14.1 ounce propane cylinder. The kit was place vertically in a fume hood, and after being ignited, the valve was adjusted to a maximum. The cuboid specimen was then placed into the flame 3 inches away from the nozzle in the direction that is in-line with the flame. The length of the specimen was parallel with the flame. The foam specimen was kept in the flame for 10 seconds and then removed away from the flame. The time that it took to extinguish the flame was recorded as self-extinguishing time.

Polyurethane foams were made with the use of 53 parts of each prepared brominated polyol set forth herein, and then cut into the test specimens that had the dimensions set forth Supra.

The tests showed that the foam specimen that was prepared in Example 2 resulted in a 2 second self-extinguishing time. After self-extinguishing, the remaining weight of the specimen was about 40% of the original weight.

In comparison, the use of non-halogenated polyols, either petroleum-based or natural oil-base, in the preparation of the polyurethane foams did not result in any measurable self-extinguishing time, which means that after 10 second exposure to the flame the specimens burned continuously until the material was completely consumed.

What is claimed is:

1. A process for preparing halogenated natural oils, the process comprising:
    (I) providing a hydroxylated natural oil;
    (II) under a negative pressure, contacting the hydroxylated natural oil with a halogenated reactive material selected from the group consisting of a halogenated anhydride of an organic acid and alkyl esters of halogenated anhydrides of organic acids; in the molar ratio of hydroxylated natural oil to halogenated reactive material ranging from 0.5:1 to 2.5:1, in the presence of an organometallic catalyst at a temperature sufficient to halogenate the natural oil.

2. A process as claimed in claim 1 wherein the natural oil hydroxylate is selected from a group consisting of:
    a. castor oil,
    b. soy bean oil hydroxylate,
    c. canola oil hydroxylate,
    d. palm oil hydroxylate,
    e. jatropha oil hydroxylate, and
    f. algae oil hydroxylate.

3. A process as claimed in claim 1 wherein the reactive halogenated materials are selected from the group consisting of
    g. halogenated maleic anhydride and,
    h. halogenated phthalic anhydride.

4. A process as claimed in claim 3 wherein the halogens on the halogenated reactive materials are selected from the group consisting of:
    i. chlorine and
    j. bromine.

5. A process as claimed in claim 1 wherein the reaction temperature is in the range of 130° C. to 200° C.

6. A process as claimed in claim 1 wherein the reaction temperature is in the range of 150 to 170° C.

7. A process as claimed in claim 1 wherein the ratio of the hydroxylated natural oil to halogenated reactive material is in the range of 0.75:1 to 2.0:1.

8. A process as claimed in claim 1 wherein the ratio of the hydroxylated natural oil to halogenated reactive material is in the range of 1.0:1 to 1.5:1.

9. A process as claimed in claim 1 wherein the time of the reaction is in the range of from 5 hours to 20 hours.

10. A process as claimed in claim 1 wherein the time of the reaction is in the range of from 10 hours to 15 hours.

11. A process as claimed in claim 1 wherein the catalyst is selected from the group consisting of:
   a. titanium (IV)2-ethylhexoxide,
   b. titanium (IV n-butoxide, and
   c. titanium (IV) isopropoxide.

12. A process as claimed in claim 1 wherein, in addition, there is present a solvent.

13. A process as claimed in claim 12 wherein the solvent is tris(chloroisopropyl)phosphate.

14. A process for the preparation of a halogenated natural oil directly from raw natural oils, the process comprising:
   (I) providing a raw natural oil;
   (II) contacting the raw natural oil with a material selected from the group consisting essentially of:
      a. a polyhydric alcohol and
      b. an alkanolamine, in the presence of a titanium catalyst for a time sufficient to form a natural oil hydroxylate;
   (III) contacting the reaction product of (II) with a halogenated reactive material in the molar ratio of raw natural oil to halogenated reactive material ranging from 0.5:1 to 2.5:1 for a period of time sufficient to form an acidic intermediate;
   (IV) contacting the reaction product of (III) with a material selected from the group consisting of
      a. a cycloalkyl carbonate,
      b. an alkylene oxide, and
      c. an alkyl glycidyl ether and a tertiary amine catalyst and heating the reaction mass at a temperature and at a time sufficient to form a halogenated natural oil.

15. A process for preparing halogenated natural oils, the process comprising:
   (I) providing an epoxidized natural oil;
   (II) under a negative pressure, contacting the epoxidized natural oil with a halogenated reactive material of an organic acid and an alcohol in the molar ratio of epoxidized natural oil to halogenated reactive material ranging from 0.5:1 to 2.5:1 in the presence of an organometallic catalyst at a temperature sufficient to halogenate the natural oil.

* * * * *